United States Patent [19]

Chubachi et al.

[11] Patent Number: 4,654,260

[45] Date of Patent: Mar. 31, 1987

[54] MAGNETIC RECORDING MEDIUM

[75] Inventors: Ryoji Chubachi; Yoshihisa Kawamura; Masashi Somezawa, all of Sendai, Japan

[73] Assignee: Sony Corporation, Tokyo, Japan

[21] Appl. No.: 444,572

[22] PCT Filed: Mar. 17, 1982

[86] PCT No.: PCT/JP82/00074

§ 371 Date: Nov. 16, 1982

§ 102(e) Date: Nov. 16, 1982

[87] PCT Pub. No.: WO82/03292

PCT Pub. Date: Sep. 30, 1982

[30] Foreign Application Priority Data

Mar. 19, 1981 [JP] Japan .................... 56-40202

[51] Int. Cl.$^4$ .............................................. G11B 5/70
[52] U.S. Cl. ...................... 428/328; 252/62.54; 427/128; 428/694; 428/900; 428/425.9; 428/522
[58] Field of Search ............ 428/694, 900, 328, 403, 428/407, 405, 425.9, 329, 522; 252/62.54; 427/128, 425.9; 360/134–136

[56] References Cited

U.S. PATENT DOCUMENTS

| | | | |
|---|---|---|---|
| 3,865,627 | 2/1975 | Roden | 427/132 |
| 4,063,000 | 12/1977 | Aonuma | 428/403 |
| 4,074,012 | 2/1978 | Heikinen | 428/900 |
| 4,167,582 | 9/1979 | Takahashi | 428/900 |
| 4,246,316 | 1/1981 | Aonuma | 428/900 |
| 4,309,471 | 1/1982 | Suzuki | 428/900 |
| 4,318,961 | 3/1982 | Ide | 428/900 |
| 4,396,668 | 8/1983 | Saito | 428/900 |
| 4,407,901 | 10/1983 | Miyatuka | 428/407 |
| 4,431,712 | 2/1984 | Matsufuji | 428/900 |
| 4,439,486 | 3/1984 | Yamada | 428/900 |
| 4,455,345 | 6/1984 | Miyatuka | 428/900 |
| 4,465,737 | 8/1984 | Miyatuka | 428/900 |
| 4,480,004 | 10/1984 | Togawa | 428/328 |
| 4,529,661 | 7/1985 | Ninomiya | 428/900 |
| 4,571,364 | 2/1986 | Kasuga | 428/900 |
| 4,572,867 | 2/1986 | Nakamura | 428/328 |

Primary Examiner—Ellis P. Robinson
Attorney, Agent, or Firm—Hill, Van Santen, Steadman & Simpson

[57] ABSTRACT

The present invention makes it possible that in a magnetic recording medium having a magnetic layer which contains therein ferromagnetic powder and serving as a magnetic recording medium for short wavelength recording in, for example, a video tape recorder, when the coercive force of the magnetic layer is over 1000 Oe, the specific surface area of its ferromagnetic alloy powder measured according to BET adsorption method is made 45 m$^2$/g or above, and the high density recording where the central recording wavelength is not more than 1 μm is carried out thus recording and playback with low noise and high output being made.

3 Claims, 2 Drawing Figures

| specimen | specific surface area of alloy powder (m$^2$/g) | mean diameter of long axis (μm) | axial ratio | residual magnetic flux density Br(G) | coercive force Hc(Oe) | squareness ratio | C/N (dB) | conditions for measuring C/N ratio | |
|---|---|---|---|---|---|---|---|---|---|
| | | | | | | | | center recording frequeucy (MHz) | track width (μm) |
| A | 45 | 0.17 | 11~13 | 2780 | 1195 | 0.79 | 50.3 | 4.3 | 10 |
| " | " | " | " | " | " | " | 50.1 | 5.0 | 10 |
| " | " | " | " | " | " | " | 54.7 | 4.3 | 30 |
| " | " | " | " | " | " | " | 54.3 | 5.0 | 30 |
| B | 48 | 0.16 | 11~13 | 2770 | 1200 | 0.79 | 50.9 | 4.3 | 10 |
| " | " | " | " | " | " | " | 55.5 | 4.3 | 30 |
| C | 51 | 0.14 | 11~13 | 2750 | 1210 | 0.78 | 51.5 | 4.3 | 10 |
| D | 60 | 0.13 | 11~13 | 2745 | 1200 | 0.78 | 54.5 | 4.3 | 10 |
| E | 66 | 0.12 | 11~13 | 2730 | 1220 | 0.77 | 55.5 | 4.3 | 10 |

FIG. 1

| speci-men | specific surface area of alloy powder (m²/g) | mean diameter of long axis (μm) | axial ratio | residual magnetic flux density Br(G) | coercive force Hc(Oe) | squareness ratio | C/N (dB) | conditions for measuring C/N ratio | |
|---|---|---|---|---|---|---|---|---|---|
| | | | | | | | | center recording frequency (MHz) | track width (μm) |
| A | 4.5 | 0.17 | 11~13 | 2780 | 1195 | 0.79 | 50.3 | 4.3 | 10 |
| " | " | " | " | " | " | " | 50.1 | 5.0 | 10 |
| " | " | " | " | " | " | " | 54.7 | 4.3 | 30 |
| " | " | " | " | " | " | " | 54.3 | 5.0 | 30 |
| B | 4.8 | 0.16 | 11~13 | 2770 | 1200 | 0.79 | 50.9 | 4.3 | 10 |
| " | " | " | " | " | " | " | 55.5 | 4.3 | 30 |
| C | 5.1 | 0.14 | 11~13 | 2750 | 1210 | 0.78 | 51.5 | 4.3 | 10 |
| D | 6.0 | 0.13 | 11~13 | 2745 | 1200 | 0.78 | 54.5 | 4.3 | 10 |
| E | 6.6 | 0.12 | 11~13 | 2730 | 1220 | 0.77 | 55.5 | 4.3 | 10 |

FIG. 2

| speci-men | specific surface area of alloy powder (m²/g) | mean diameter of long axis (μm) | axial ratio | residual magnetic flux density Br(G) | coercive force Hc(Oe) | squareness ratio | C/N (dB) | conditions for measuring C/N ratio | |
|---|---|---|---|---|---|---|---|---|---|
| | | | | | | | | center recording frequency (MHz) | track width (μm) |
| F | 25 | 0.70 | 11~13 | 2930 | 1190 | 0.81 | 45.0 | 4.3 | 10 |
| " | " | " | " | " | " | " | 44.0 | 5.0 | 10 |
| " | " | " | " | " | " | " | 49.5 | 4.3 | 30 |
| " | " | " | " | " | " | " | 49.2 | 5.0 | 30 |
| G | 27 | 0.50 | 11~13 | 2890 | 1200 | 0.81 | 45.4 | 4.3 | 10 |
| H | 28 | 0.45 | 11~13 | 2870 | 1210 | 0.81 | 45.7 | 4.3 | 10 |
| I | 32 | 0.30 | 11~13 | 2830 | 1195 | 0.80 | 46.7 | 4.3 | 10 |
| J | 37 | 0.25 | 11~13 | 2810 | 1200 | 0.80 | 48.0 | 4.3 | 10 |
| K | 43 | 0.19 | 11~13 | 2790 | 1210 | 0.79 | 49.5 | 4.3 | 10 |

MAGNETIC RECORDING MEDIUM

TECHNICAL FIELD

This invention relates to a magnetic recording medium for high density recording in which a short wavelength signal is recorded in, for example, a video tape recorder (VTR) and particularly to a magnetic recording medium in which a magnetic layer containing a ferromagnetic alloy powder is formed on a nonmagnetic substrate.

BACKGROUND ART

In the VTR, a luminance signal is usually recorded in the manner of frequency modulated (FM) signal. In recording the signal, a recording wavelength must be considered which corresponds to a frequency existing at the center of FM carrier having deviation for the luminance signal which occupies the highest band of recorded signal. In the present inventions, the frequency at the center of the FM carrier will be referred to as a center recording frequency and a wavelength corresponding to the center recording frequency will be referred to as a center recording wavelength.

Up to the present, various VTRs have been proposed and put into practice. Recently, it has been a trend to promote the short wavelength recording which aims particularly the high density recording, which requires the center recording wavelength thereof to be 1 μm or below.

While, for a magnetic recording medium for VTR, it has been tried to improve the surface property of the magnetic recording medium whereby to make a spacing loss between a magnetic head and the magnetic recording medium be reduced as much as possible. But, in spite of these previously proposed techniques, the center recording wavelength of those prior art magnetic recording media which utilize chromium dioxide or iron oxide as magnetic powder was generally about 1 μm at best in practice.

While, with a magnetic recording medium which utilizes a ferromagnetic alloy powder (in the specification of this invention, the ferromagnetic alloy powder includes a single substance of Fe), if the playback output therefrom is increased by high coercive force and high residual magnetization thereof and if it is tried to reduce the spacing loss between the magnetic medium and the magnetic head as much as possible, it may be considered that the aforesaid high density recording will relatively easily be made possible. However, as the output increases, a noise is also increased so that a picture with high quality can not be achieved. Therefore, such magnetic recording medium has not yet been practiced.

DISCLOSURE OF THE INVENTION

This invention is to provide a magnetic recording medium having a magnetic layer, which contains the above ferromagnetic alloy powder and is formed on a nonmagnetic substrate, and producing a high output with a low noise level and which is for use in the high density recording.

That is, in accordance with the present invention, it is clarified that a specific surface area measured by BET adsorption method of a ferromagnetic alloy powder such as acicular Fe powder, Fe-Co powder, Fe-Co-Ni powder and the like affects a noise level. On the basis of such clarification, in a magnetic recording medium where a magnetic layer containing the aforesaid ferromagnetic alloy powder is formed on the nonmagnetic substrate, the coercive force of the magnetic layer is made 1000 Oe or more and the specific surface area thereof measured by the BET adsorption method is made 45 $m^2/g$ or above so that a magnetic recording medium for high density recording can be constructed, of which the center recording wavelength is less than 1 μm.

Here, as the ferromagnetic alloy powder, there can be utilized Fe, Fe-Co, Fe-Co-Ni and so on or an acicular alloy powder containing additional elements such as Al, Cr, Si and the like in fairly small amount, considering, for example, anti-corrosion or the prevention of the sintering upon manufacturing. These acicular alloy powders can be obtained by reducing acicular iron oxide and iron hydroxyoxide and if necessary, iron oxide containing metals such as Ni, Co and so on or iron hydroxyoxide as a starting material in a reducing atmosphere such as $H_2$ gas and so on. The specific surface area of this ferromagnetic alloy powder can be controlled by selecting the specific surface areas of the aforesaid starting materials.

A coercive force Hc of the magnetic layer is selected more than 1000 Oe (oersted), preferably in a range from 1000 to 2000 Oe, more preferably in a range from 1100 to 1500 Oe. That is, when the short wavelength recording is intended, it is desired that the coercive force is selected large to some extent, namely, more than 1000 Oe. But, when the coercive force is made too large, this will cause a problem that a saturation will occur in the magnetic head upon recording and also the recorded signal will be difficult to be erased.

In order to make the coercive force Hc 1000 Oe or above, since the coercive force Hc is dependent on shape anisotropy, it is desired that an axial ratio of ferromagnetic alloy (acicular ratio), namely, ratio between long axis and short axis is selected 7 or more, preferably more than 10.

Moreover, it is preferable to select a coating thickness of the magnetic layer (after having been dried) to be 0.5 to 6 μm thick. This is because if the coating thickness is too thin, it is difficult to form the uniform coating film so that drop of signal, namely, a so-called dropout occurs, while if the coating film is too thick, a thickness loss due to self-demagnetization occurs.

Furthermore, a P/B ratio which is a ratio between weight of the magnetic powder and weight of the binder which form the magnetic layer is selected to be in a range from 5 to 12, preferably in a range from 6 to 10. This is because if the amount of binder is too much, namely, if the P/B ratio is too small, a residual magnetic flux density Br is made insufficient so that an S/N ratio (signal to noise ratio) can not be improved, while if the P/B ratio is too large, socalled coming-off amount of powder is increased to lower the durability thereof.

As the binder used in this magnetic layer, the followings can be exemplified, by way of example: nitrocellulose; vinyl chloride-vinyl acetate copolymer; vinyl chloride-vinyl acetate-vinyl alcohol copolymer; vinyl chloride-vinyl propionate copolymer; vinylidene chloride-vinyl chloride copolymer; vinylidene chloride-acrylonitrile copolymer; acrylonitrile-butadiene copolymer; acetal resin; butyral resin; formal resin; polyester resin; polyurethane resin; polyamide resin; epoxy resin; and phenoxy resin and the like or mixtures thereof.

For the magnetic layer, aluminum oxide, chromium oxide, silicon oxide can be added as a reinforcing element thereof; squalane as a lubricant thereof; carbon black as an antistatic agent thereof; and lecithin as a dispersant thereof.

Materials to form the magnetic layer are dissolved in an organic solvent to prepare the magnetic coating material, which are then coated on the nonmagnetic base. The solvents for the magnetic coating material are as follows: ketone (for example, acetone, methyl ethyl ketone, methyl isobutyl ketone, cyclohexanone); alcohol (for example, methanol, ethanol, propanol, butanol); ester (for example, methyl acetate, ethyl acetate, butyl acetate, ethyl lactate, glycol acetate, monoethyl ether); glycol ether (for example, ethylene glycol dimethyl ether, ethylene glycol monoethyl ether, dioxane); aromatic hydrocarbon (for example, benzene, toluene, xylene); aliphatic hydrocarbon (for example, hexanone, heptane); and nitro propane and so on. The nonmagnetic bases on which the magnetic coating material is coated are as follows; polyester (for example, polyethylene telephthalate); polyolefin (for example, polypropylene); cellulose derivative (for example, cellulose triacetate, cellulose diacetate); polycarbonate; polyvinyl chloride; polyimide; polyamide; polyhydrazide; metal (for example, aluminum, copper); and paper and so on.

In this invention, as described before, the specific surface area measured according to the BET adsorption method of the ferromagnetic alloy powder which forms the magnetic layer is selected to be 45 m$^2$/g. This is due to the discovery by the modulation noise measurement that when the specific surface area measured according to the BET adsorption method was selected to be 45 m$^2$/g, a desired low noise level could be established in the case of the recording wavelength being a short wavelength of 1 μm or below. Even if this specific surface area measured according to the BET adsorption method is in a range of 45 m$^2$/g or above and there will not occur super-paramagnetic state, the range may be usable. However, practically, a range from 45 to 150 m$^2$/g is preferable.

BRIEF DESCRIPTION OF THE DRAWINGS

FIGS. 1 and 2 are respectively characteristic tables for an example of a magnetic recording medium according to this invention and a comparative example thereof.

BEST MODE FOR CARRYING OUT THE INVENTION

Next, an example of this invention will be described.

| | |
|---|---|
| acicular ferromagnetic iron powder | 100 parts by weight |
| vinyl chloride - vinyl acetate copolymer (VINYLITE VYHH manufactured by Union Carbide Corp.) thermoplastic polyurethane resin | 11 parts by weight |
| (ESTAN 5701 manufactured by B. F. Goodrich Co.) | 5 parts by weight |
| chromium oxide (Cr$_2$O$_3$) | 5 parts by weight |
| carbon black | 5 parts by weight |
| lecithin | 2 parts by weight |
| fatty acid ester | 1 part by weight |
| toluene | 50 parts by weight |
| methyl ethyl ketone | 50 parts by weight |
| cyclohexanone | 50 parts by weight |

The above-described composition was put into a ball mill, mixed and dispersed for 20 hours, then added with 4 parts by weight of isocyanate compound (DESMODULE L-75 manufactured by Bayer A.G), and dispersed by high speed shear mixing for 1 hour to produce a magnetic coating material.

This magnetic coating material was coated on one surface of a polyethylene telephthalate film of 14 μm thick and with a surface roughness of 0.03 μm so as to be 4.0 μm in thickness after it was dried. Then, it was subjected to an orientation treatment in DC magnetic field of 2500 Gauss, heated and dried at 100° C., then subjected to a super-calender treatment and then cut into ½-inch width, resulting in a video tape, namely, a magnetic recording medium. By the similar processes, magnetic recording media (specimens A to E) of five kinds were made where were used alloy powders with different specific surface areas measured according to the BET adsorption method and their electro-magnetic characteristics were measured. Results thereof are indicated on the table of FIG. 1, where a modulation noise (C/N ratio: carrier to noise ratio) was measured under the condition that the relative speed between a magnetic recording medium and a magnetic head was selected as 3.5 m/sec, the center recording frequency was selected as both 4.3 MHz and 5.0 MHz, namely, when the center recording wavelength was less than 1 μm, the modulation frequency was ±2 MHz both, the band width was selected as 10 kHz and the track width was selected as both 30 μm and 10 μm. The magnetic recording head used was employed sendust alloy as a magnetic core, while the magnetic playback head used was employed magnetic ferrite as a magnetic core.

While, comparative specimens F to K were made by the similar method to that of the afore-mentioned example, in which each of specific surface areas of Fe powders as the ferromagnetic alloy powder was not more than 50 m$^2$/g, and then like measurements thereof were performed. Results thereof are shown in the table of FIG. 2.

As is clear from the table of FIG. 1, in the case of the specimen A, even in the high density recording where the track width was reduced to 10 μm. C/N ratio of more than 50 dB is obtained so that a picture of high quality can be obtained. If the specific surface area is increased more, C/N ratio is increased more. Thus it is expected that the track width will be reduced more to thereby enable the higher density recording to be carried out. That is, to effect the high density recording, it is required that not only the recording wavelength must be reduced but also the track width must be reduced. However, if the C/N ratio is low, the track width can not be reduced. According to the example of this invention, the C/N ratio can be increased so that the track width can be reduced and thereby the recording density can be improved. As compared therewith, in the specimens F to K where each of the specific surface areas of magnetic alloy powders is not more than 50 m$^2$/g, each C/N ratio thereof indicates a low value of not more than 50 dB.

In the specimens A to K, there was hardly recognized a difference of surface roughness, so it can be considered that the C/N ratio depends on the specific surface area. The surface roughness of each of the specimens was measured by a tracer-type surface roughness measuring apparatus, where the measurement error of the surface roughness was within ±0.001 μm.

As described above, according to this invention, noise reduction becomes possible in the region of the center recording wavelength being less than 1 μm so that the high density recording can be made in association with the short wavelength recording.

INDUSTRIAL APPLICABILITY

This invention can be applied to magnetic recording media which are for use with a video tape recorder, an audio tape recorder, a digital signal recorder and the like

We claim:

1. A magnetic recording medium for a high density recording with center recording wavelength of less than 1 μm in which a magnetic layer containing an acicular ferromagnetic alloy powder dispersed in a binder is formed on a nonmagnetic substrate, characterized in that the powder to binder ratio is from 5 to 12 to 1 parts by weight, the coercive force of said magnetic layer is 1000 Oe or above, and said powder has a specific surface area measured according to the BET adsorption method of 45 $m^2/g$ or above, said specific surface are providing a carrier to noise ratio of at least 50 dB.

2. A magnetic recording medium according to claim 1 wherein said powder has an acicular ratio of at least 7.

3. A magnetic recording medium comprising:
   a support containing a ferromagnetic alloy powder and a binder,
   the powder to binder ratio being in the range of 5 to 12 to 1 parts by weight, said ferromagnetic powder having a coercive force of at least 1000 Oe and a specific surface area of at least 45 $m^2/g$, the specific surface area being sufficiently large to provide a medium with a significantly improved carrier to noise ratio as compared with a medium having a powder of substantially lower specific surface area.

* * * * *